United States Patent Office 2,695,793
Patented Nov. 30, 1954

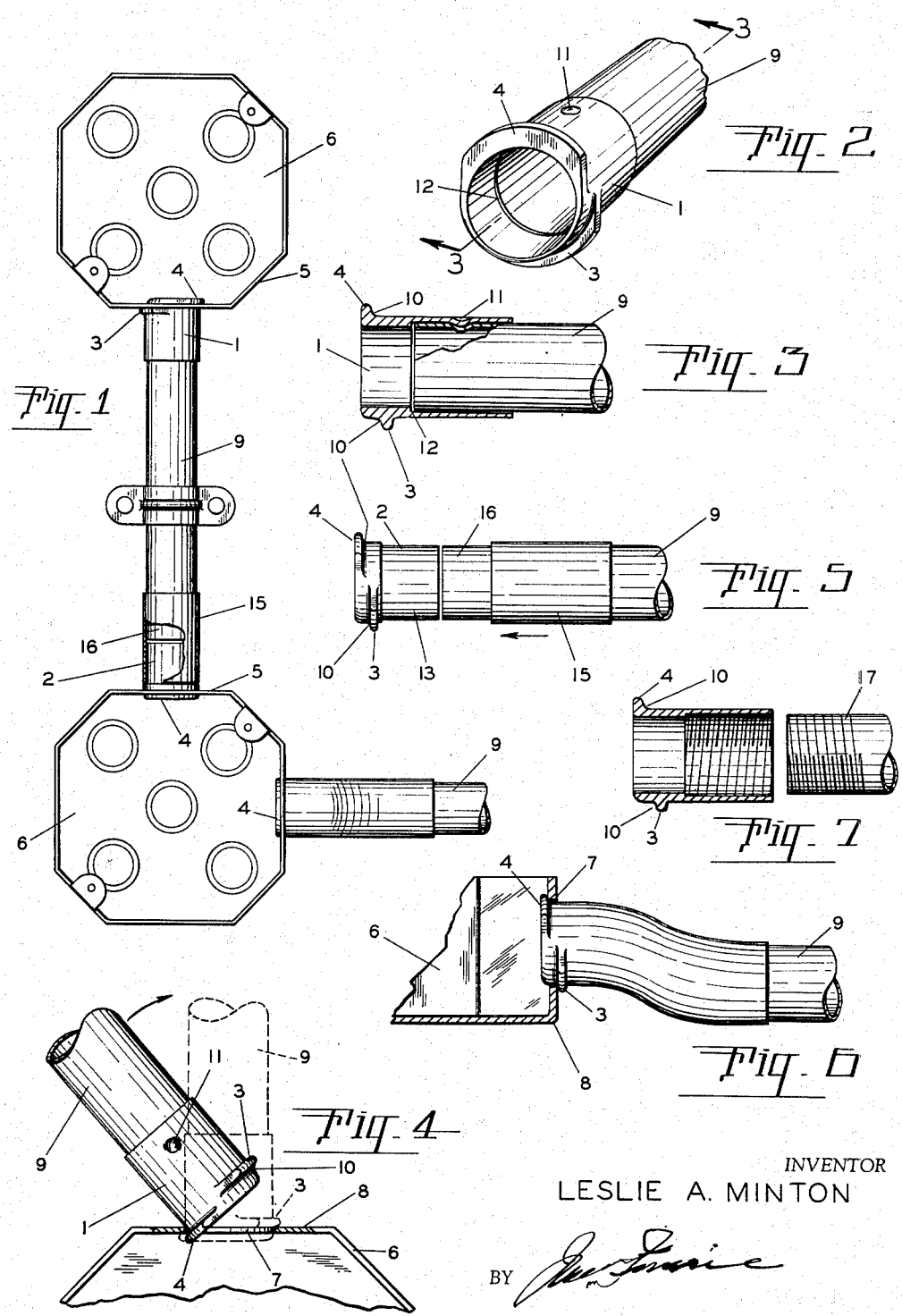

2,695,793

CONNECTORS FOR ELECTRIC OUTLET BOXES

Leslie A. Minton, Portland, Oreg.

Application January 24, 1950, Serial No. 140,257

2 Claims. (Cl. 285—5)

This invention relates to electric conduit and outlet box connectors, and is particularly adapted to be used with standard conduit or flexible tubing.

The primary object of the invention is the provision of a connector consisting of one piece that can be easily inserted into the outlet box, and once it is installed it provides a solid rigid connection between the conduit and the box.

Another object of the invention is to provide a connector that will extend into the outlet box a limited distance, thereby saving valuable space within the box.

A further object of the invention is the elimination of all sharp corners and edges, which heretofore has injured the wiring in many cases.

A still further object of the invention is the provision of a connector that can be installed or removed from the outlet box without any additional locking parts than those formed on the connector.

And a still further object of the invention is the provision of a connector that can be economically manufactured in great quantities.

These and other incidental objects will be apparent in the drawings, specification and claims.

Referring to the drawings:

Figure 1 illustrates two outlet boxes connected together by a standard conduit using my new and improved connector.

Figure 2 is a perspective view looking into one of my connectors, the same being secured to the end of a conduit pipe and removed from the box.

Figure 3 is a sectional view, taken on line 3—3 of Figure 2, looking in the direction indicated.

Figure 4 illustrates how the conduit is swung to the side at an angle to the hole in the box while inserting the connector therein.

Figure 5 illustrates how my connector is adapted to connect the opposite end of the conduit within the second outlet box when the said box is already installed.

Figure 6 illustrates how I can adapt my system of connecting an offset fitting to the box.

Figure 7 is a sectional view of my connector adapted to connect to a threaded conduit pipe.

Referring more specifically to the drawings:

My invention consists of connectors 1 and 2. Both connectors have oppositely disposed flanges or lips 3 and 4 formed on one of their ends. These flanges or lips are offset from one another the thickness of the metal 5 of the outlet box 6.

Referring to Figure 4, the flange or lip 4 is inserted through the opening 7 of the outlet box 6, then brought to the dotted position causing the flange or lip 3 to engage the outer face of the wall 8 of the box adjacent the edge of the hole 7. The lip 4 prevents the connector from being withdrawn from the hole while the flange or lip 3 prevents the coupling from being forced into the hole. When the conduit pipe 9 is brought to the dotted position the flanges or lips engage both sides of the wall of the box snugly.

Referring particularly to Figures 3 and 5, it will be noted that the flanges or lips have a fillet 10 which comes adjacent the outside and inside of the wall of the outlet box centering the connector within the hole 7 and holding the same tightly therein, providing an efficient electric ground between the conduit and the box.

Referring to Figure 3, it will be noted that the conduit 9 enters the end of the connector and is locked therein by the dent 11 in the usual manner. It will be noted that a shoulder 12 is provided limiting the entrance of the conduit within the connector.

In Figure 5 the coupling 2 is illustrated having the outside diameter of the shank 13 the same as the conduit 9. A sleeve 15 is provided for slipping over the shank 13 and the end 16 of the conduit, after which dents are formed on the sleeve relative to the connector and the conduit.

Referring to Figure 1, the sleeve has been brought into place locking the conduit 9 to the connector 2, part of the sleeve is broken away for convenience of illustration. This type of connector is used when the box is already installed; where the box has not already been installed the sleeve can be dispensed with by tilting the box.

In Figure 6 I illustrate my principle of adapting an offset connector to the outlet box, as my invention is in the principle of locking the connector to the box by way of the flanges or lips 3 and 4 engaging the edges of the hole within and outside the box, wedging itself tightly therein when brought into alignment with the center line of the hole.

My invention of oppositely disposed flanges or lips associated with connectors and adapted to be inserted within holes formed in boxes may be applied to any type of connector, as for instance in Figure 7 I show a connector which is threaded to the pipe 17, or the connector may be adapted to be connected to what is known as flexible conduit, as BX.

Although certain specific embodiments of the invention have been shown and described, it is obvious that many modifications thereof are possible. The invention, therefor, is not to be restricted except in so far as is necessitated by the prior art and by the spirit of the appended claims.

What I claim is:

1. An integral one piece conduit connector for outlet boxes adapted to extend through and engage the peripheral walls of an opening in such boxes, comprising a single elongate tubular element having a relatively long body of uniform uninterrupted external cylindrical contour substantially equal in diameter to the diameter of the opening of an outlet box to which it is to be connected, an external, radially extending, uninterrupted, integral terminal end flange circumferentially limited to a segment bounded by parallel tangential planes at diametrically opposite points on the external surface of the body, the surface thereof facing away from the terminal end of the body being adapted to engage the inner face of the peripheral walls of the opening of the box, and a companion external, radially extending, uninterrupted, flange spaced axially in the direction of the body from said first mentioned flange by a distance substantially equal to the thickness of the peripheral walls of the box opening, the surface thereof facing the first mentioned flange being adapted to engage the outer face of said peripheral walls of said box opening along a surface circumferentially spaced from the surfaces engaged by said terminal flange, the base of the confronting flange surfaces being formed with fillets for cooperatively snugly engaging the opening of the outlet.

2. The combination with two spaced outlet boxes having confronting openings in the walls thereof, connectors in said opening each comprising a single elongate tubular element having a relatively long body of uniform uninterrupted external cylindrical contour substantially equal in diameter to the diameter of the opening of an outlet box to which it is to be connected, an external radially extending uninterrupted integral terminal end flange circumferentially limited to a segment bounded by parallel tangential planes at diametrically opposite points on the external surface of the body, the surface thereof facing away from the terminal end being adapted to engage the inner face of the peripheral walls of the opening of the box, and a companion external radially extending uninterrupted flange spaced axially in the direction of the body from said first mentioned flange by a distance substantially equal to the thickness of the peripheral walls of the box opening, the surface thereof facing the first mentioned flange being adapted to engage the outer face of said peripheral walls of said box opening along a surface circumferentially spaced from the surface engaged by said terminal flange, the base of the confronting flange surfaces being formed with fillets for cooperatively snugly engaging the opening of the outlet and telescoping tubular means interconnecting said connectors by slidable engagement over the uninterrupted cylindrical contour of at least one of said connectors.

References Cited in the file of this patent

UNITED STATES PATENTS

| Number | Name | Date |
|---|---|---|
| 470,514 | Simpson | Mar. 8, 1892 |
| 1,389,997 | Sedgwick | Sept. 6, 1921 |
| 1,644,310 | Strongson | Oct. 4, 1927 |
| 1,768,095 | Arthur | June 24, 1930 |
| 1,795,196 | Carlson | Mar. 3, 1931 |
| 2,200,874 | Dann | May 14, 1940 |
| 2,241,293 | Campbell | May 6, 1941 |
| 2,344,698 | Howe | Mar. 21, 1944 |